Dec. 16, 1952  B. J. POWELL  2,621,537
BRAKE LEVER STRUCTURE
Filed Nov. 24, 1947  2 SHEETS—SHEET 1
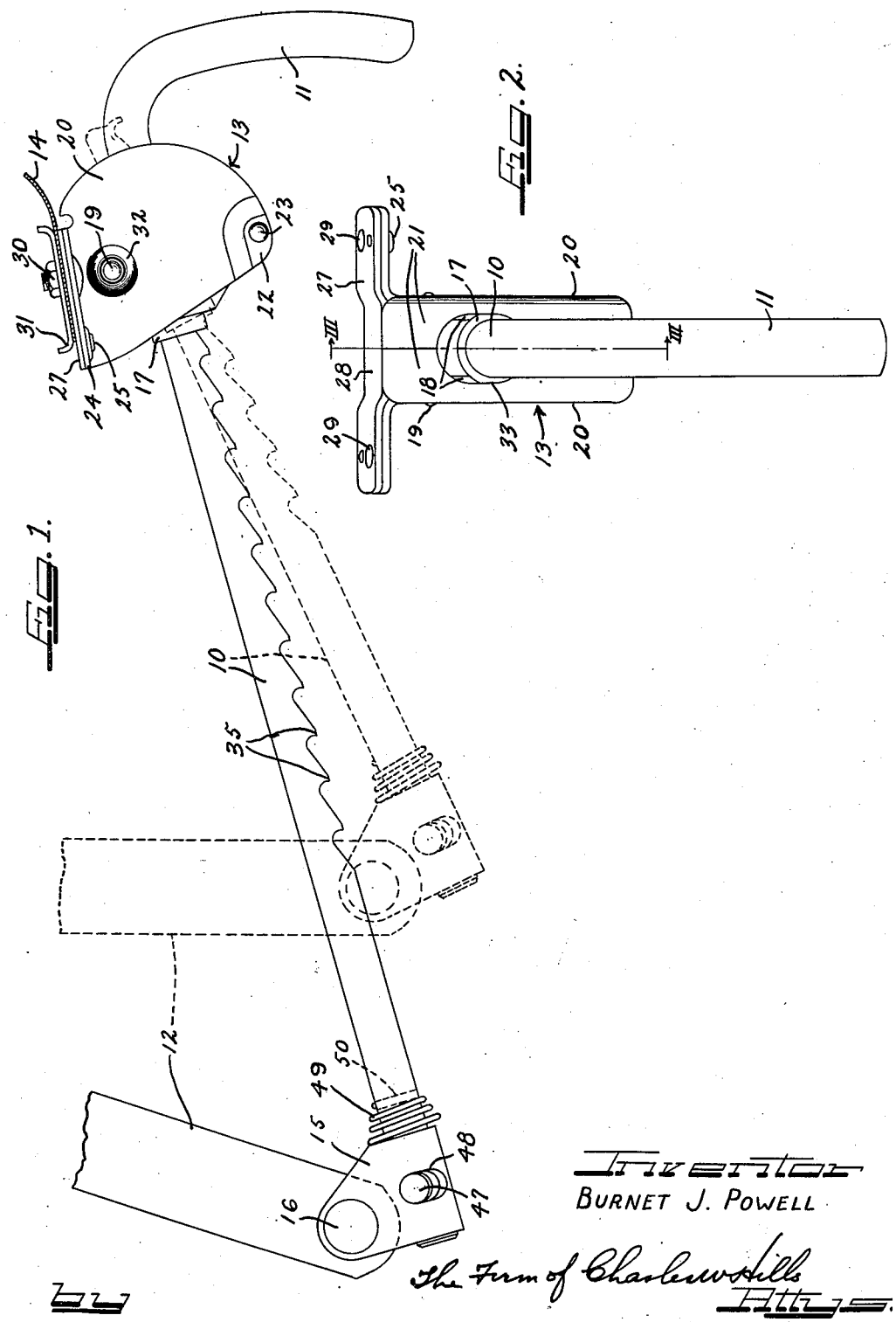
Inventor
BURNET J. POWELL
The Firm of Charles W. Hills
Attys.

Dec. 16, 1952     B. J. POWELL     2,621,537
BRAKE LEVER STRUCTURE
Filed Nov. 24, 1947     2 SHEETS—SHEET 2
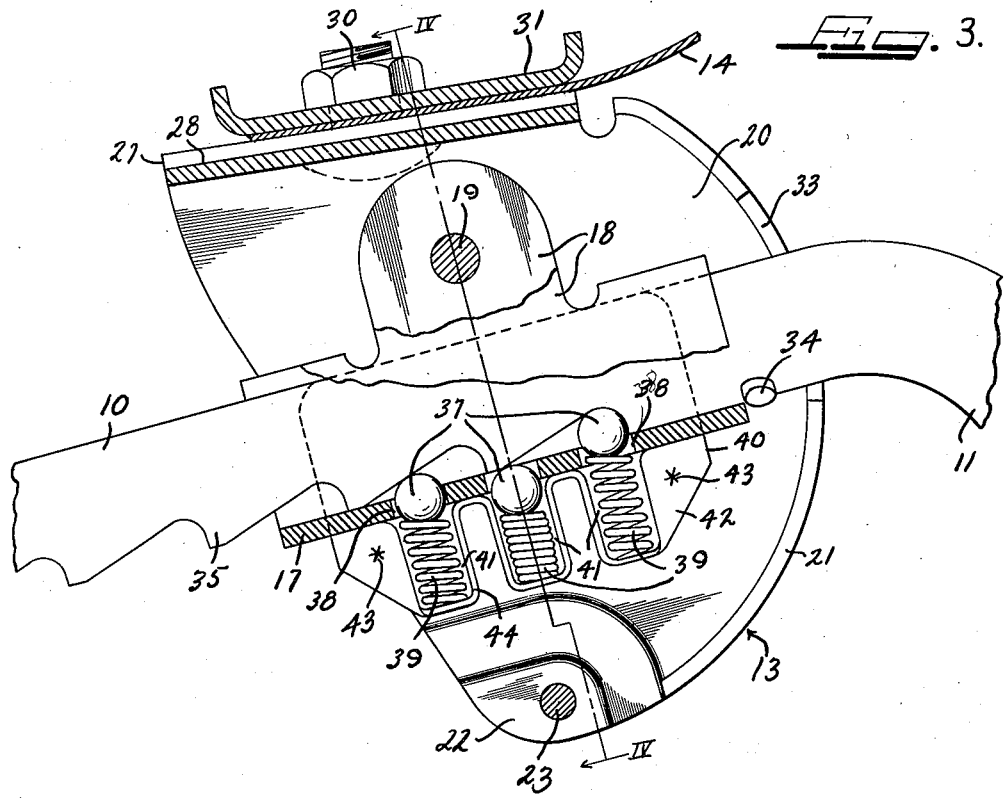
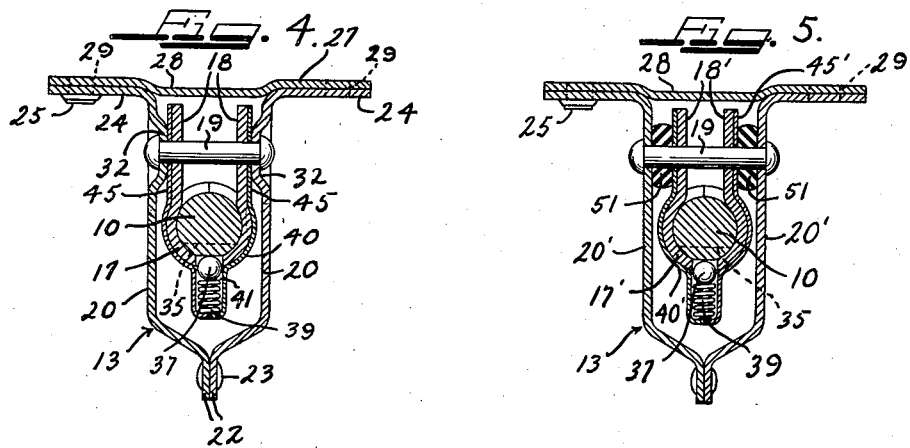
Inventor
BURNET J. POWELL
The Firm of Charles W. Hills
Attys.

UNITED STATES PATENT OFFICE 2,621,537

BRAKE LEVER STRUCTURE

Burnet J. Powell, North Chicago, Ill., assignor to Houdaille-Hershey Corporation, Detroit, Mich., a corporation of Michigan Application November 24, 1947, Serial No. 787,713

9 Claims. (Cl. 74—503)

This invention relates to improvement in brake lever assemblies and more particularly concerns assemblies of this character which are especially adaptable for use with the emergency brakes in automobiles or the like.

An important object of the present invention is to provide an improved, simplified and efficient brake lever assembly.

Another object of the invention is to provide a brake lever assembly embodying improved supporting housing and ratchet guide and detent structure.

A further object of the invention is to provide an improved ratchet rod supporting structure for brake lever assemblies including a novel rod guiding arrangement.

Yet another object of the invention is to provide an improved ratchet rod guiding and detent assembly.

Still another object of the invention is to provide in a brake lever assembly an improved, simplified supporting housing and guide structure adapted to be made principally from simple sheet metal stampings and enabling high speed, economical mass production manufacture and assembly.

A further object of the invention is to provide a novel pivoted ratchet rod guide assembly and supporting housing therefor.

Still another object of the invention is to provide an improved quietly operating guiding and pawl and detent controlling assembly for a ratchet rod in a brake lever assembly.

An additional object of the invention is to provide an improved small incremental detent and ratchet control for the operating rods of brake levers, and more particularly straight pull brake levers.

Other objects, features and advantages of the present invention will be readily apparent from the following detailed description of certain preferred embodiments thereof taken in conjunction with the accompanying two sheets of drawings, in which:

Figure 1 is a side elevational view of a brake lever assembly, and more particularly a straight pull brake lever assembly, embodying features of the invention;

Figure 2 is a handle and elevational view of the brake lever assembly of Figure 1;

Figure 3 is an enlarged fragmentary vertical sectional view, partially in elevation and partially in section, and taken substantially on the line III—III of Figure 2;

Figure 4 is a vertical sectional view on a reduced scale taken substantially on the line VI—VI of Figure 3; and Figure 5 is a sectional view, similar to Figure 4, but showing a slightly modified construction.

In the brake lever assembly as shown in Figures 1 to 4, inclusive, and which comprises what is known as a straight pull brake lever, a ratchet rod 10 has a manipulating handle 11 at one end and is connected at its opposite end to a brake actuating lever 12. A supporting and guiding structure 13 which may conveniently be mounted on a portion of the vehicle with which the assembly is associated, such as a dash panel 14, is of such a character that when it is desired to set the brakes, such as the emergency brakes of the vehicle, the handle 11 is adapted to be grasped and the ratchet or pull rod 10 pulled toward the person operating the same for actuating the lever 12. The latter is appropriately pivotally mounted on the vehicle with which it is associated and is connected to the brakes of the vehicle through the medium of the usual cable in a manner which is well known, and for that purpose has not been specifically illustrated.

A connection between the rod 10 and the lever 12 is effected by means such as a clevis 15 pivotally connected to the end of the lever 12 as by means of a connecting pin 16 and appropriately secured to the adjacent end of the rod.

The pull rod 10 is preferably cylindrical in cross section and is reciprocably guided and controlled by means of a guide device 17 which is formed up as a tube and may be made from an appropriate piece of sheet metal bent to tubular form and with adjacent edges in abutment, preferably at the top of the assembly, as shown in Figure 2.

Formed integral and in one piece with the guide tube 17, and preferably as upward extensions of the sides of the tube 17, is a spaced parallel pair of attachment ears 18 (Figures 3 and 4) which are connected through the medium of means such as a pin or rivet 19 to a supporting casing or housing which, in the present instance, comprises complementary similar plates or shell halves 20.

The supporting housing shell halves 20 are formed preferably as sheet metal stampings spaced apart to provide a chamber therein and formed with complementary rear, edgewise opposing, spacer flanges 21 resting in abutment in assembly and held thus by lower spacer pads 22 inset from the planes of the respective major walls of the plates and secured together as by means of a rivet 23. While the flanges 21 cooperate to provide a rear wall for the housing, the front of the housing is left open.

At their upper margins the plates 20 are formed with coplanar oppositely laterally projecting respective attachment flanges 24 which are appropriately secured as by means of rivets 25 to a top cross plate 27 having the intermediate portion thereof spanning the space between the housing shells and inset as at 28 for rigidity and centering purposes in assembly. Appropriate apertures 29 in the attachment flange and cross plate assembly afford passage for the shanks of attachment screws or bolts 30 by which the assembly is secured to the under flange of the dash member 14, a reinforcing washer plate 31 being disposed at the upper side of the dash panel flange whereby to clamp the dash flange between the upper plate 27 of the housing assembly and the washer plate.

Since, in the operation of the brake lever assembly, the pull rod 10 in its operative relation with the lever 12 describes, in addition to its longitudinal movement, a range of arcuate movement, substantially as indicated in full and dash outlines in Figure 1, provision is made for accommodating the arcuate movement. Herein, this is accomplished by having the attachment ears 19 of the rod guide tube pivotally supported by the rivet pin 19 so that the rod guide tube 17 is adapted to swing in the arcuate movements of the rod. In order to afford full clearance of the tube 17 with respect to the adjacent inner faces of the side plates or shell 20 of the supporting housing, the walls of the supporting housing where they are engaged by the rivet pin 19 are formed with appropriately apertured insets 32 (Figures 1 and 4) which afford spacer pads opposing the adjacent attachment ears 18 and maintaining the tube 17 in spaced relation to the side plates. In addition, the front spacer flanges 21 of the side plates are formed with a vertically elongated, mutually provided slot 33 to accommodate the swinging movements of the rear or handle portion of the pull rod.

Forward movement of the pull rod 10 in the fully released condition of the brake is limited by a stop pin 34 carried by the handle portion of the pull rod and engageable with the rear end of the guide tube 17 serving as a stop abutment.

Finely incremental brake setting adjustment of the pull rod 10 is effected by a ratchet and detent arrangement including a series of ratchet teeth 35 formed in the rod 10 cooperable with a series of detent elements, in the present instance comprising three balls 37 associated with guide tube 17. Each of the detent balls 37 is constrained to operate through a circular detent opening 38. The detent openings 38 are disposed in equally spaced longitudinal series calculated with respect to the length of the respective ratchet teeth 35 to effect a 3-to-1 incremental adjustment of the brake lever pull rod 10 with respect to each of the teeth 35. Each of the detent balls 37 is constantly biased resiliently into ratcheting relation toward the ratchet teeth 35 means such as respective coiled compression springs 39.

Means for retaining the springs 39 comprises a spring housing structure including a pair of sheet metal shells 40 of identical complementary formation cooperating to afford spring pockets 41. To this end, each of the shells 40 is of a formation to engage one side of the rod guide tube 17 in snugly embracing relation and is formed with a flange arrangement 42 extending generally radially with respect to the tube 17 and preferably abutting face-wise with the like flange of the companion shell 40 and secured adjacent to the respective opposite ends as by means of welding 43. Intermediately, the respective flanges 42 are appropriately configurated, each to provide one-half of the respective spring pockets 41 by means of respective offsets which, intermediate the spring pockets, are defined by laterally extending wall flanges 44 abutting edgewise in assembly to enclose the pockets 41. This construction is best visualized in Figures 3 and 4. The spring pockets 41 are, of course, coaxial in assembly with the detent apertures 38.

In addition, the spring housing plates or shells 40 are preferably formed with ears 45 which are generally coextensive with the attachment ears 18 of the rod guide tube and are appropriately apertured in registry with the ears 18 for passage of the attachment and pivot rivet pin 19 (Figure 4).

From the foregoing, it will be observed that all of the parts going into the assembly of the brake lever structure are adapted to be manufactured by known or preferred mass production methods of manufacture, and that assembly can be easily and quickly effected also by mass production methods. The housing comprising the side shells 20 can be assembled into a sub-assembly unit. The rod guide tube and spring housing assembly can be fabricated as a separate unit, and the detent balls and biasing springs loaded thereinto. Then the pull rod 10 and the guide tube and detent assembly may be assembled together. On the other hand, the guide tube and detent assembly can be assembled through the front opening into the chamber in the completed housing afforded by the plates or shells 20, and the pull rod 10 thereafter assembled.

In operation, when it is desired to set the brake with which the brake lever assembly is associated, the handle 11 is grasped and drawn rearwardly by the operator of the vehicle, thus swinging the setting lever 12 rearwardly, the pull rod 10 being maintained in any preferred condition of brake setting adjustment by interengagement of the ratchet teeth 35 and the detent elements 37. For releasing the brake, the handle 11 is again grasped and is turned until the ratchet teeth 35 are clear of the detent elements 37, whereupon the tension of the brake may be effective to draw the lever 12 and the pull rod 10 forwardly to the released position. If the tension of the brake is insufficient, the pull rod 10 can be pushed forwardly to its limit as defined by the stop pin 34.

Means are provided for controlling the turning movements of the pull rod 10, such means comprising an arrangement in association with the attachment clevis 15 by which the pull rod is attached to the brake actuating lever 12. Accordingly, the forward end portion of the pull rod 10 is rotatably associated with the clevis 15 and has a connecting and rotation limiting pin 47 (Figure 1) projecting fixedly laterally therefrom and operable in a rotation limiting slot 48 in the clevis, herein arranged so that the pull rod 10 can be swung in a counterclockwise direction by the operator manipulating the handle 11. For biasing the pull rod 10 normally into the ratcheting position thereof, that is, with the ratchet teeth 35 in operative relation to the detent elements 37, a torsion element comprising a helical spring 49 is provided having one end attached to the clevis 15 and the other end attached to the pull rod 10 as by insertion thereof into a transverse bore 50 in the pull rod. Thus, when the pull rod 10 is turned for releasing it from the detents, the torsion spring 49 is loaded, and promptly upon release of the turning pressure on the pull rod turns the pull rod back to its ratcheting position as limited by the pin 47.

In the modification of Figure 5, only one important difference exists, and that has to do with sound deadening the structure so that when the pull rod 19 is drawn rearwardly to set the brake, the vibrations incident to click of detent elements 37 advancing over the ratchet teeth 35 will be deadened and thus prevented from being noisily amplified by the dash panel 14 acting as a sounding board. Accordingly, all details of construction of the device may be identical with the form just described with the exception that side plates 20' of the supporting housing which, in all other respects, are identical with the side plates 20 of the housing in the first-described form, are straight throughout those portions thereof which oppose the pull rod guide tube 17 and the spring housing shell structure 40, and more particularly where the attachment rivet 19 engages the plates 20'. On the other hand, the attachment ears 18' and 45' of the guide tube and detent spring housing structure may be inset toward one another slightly more than in the previously described form whereby to afford a substantial space between the respective adjacent inner faces of the side wall panels or plates 20' of the supporting housing. In the respective spaces are disposed resilient sound-deadening elements 51, herein shown as resilient rubber washers maintained under compression between the plates 20' and the adjacent faces of the ears 45' concentric about the attachment rivet pin 19. Thereby, the sound-deadening elements 51 serve as spacers and also as vibration and sound-deadeners or dampers.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a brake lever assembly of the character described, a shell structure providing a housing having a chamber therein including spaced parallel walls, a ratchet rod, a guide and detent assembly for said ratchet rod including a structure having parallel projecting ears, the outer dimensions between said ears being less than the spacing between said parallel walls, and a securing pin extending between said walls and through said ears, said walls having means disposed at the portions defining the area thereof engaged by said pin and serving as spacers engaging said ears to maintain the guiding and detent assembly in generally spaced relation to said walls.

2. In combination in a brake lever assembly of the character described, a shell structure providing a housing having a chamber therein including spaced parallel walls, a ratchet rod, a guide and detent assembly for said ratchet rod including a structure having parallel projecting ears, the outer dimension between said ears being less than the spacing between said parallel walls, and a securing pin extending between said walls and through said ears, the pin having resilient vibration damping means thereabout between said ears and the adjacent walls.

3. In combination in a brake lever assembly of the character described, a support structure providing spaced parallel members, a ratchet rod, a guide and detent assembly for said rod, said guide and detent assembly having a portion thereof providing oppositely facing surfaces respectively disposed in opposed spaced relation to said parallel respective members, means pivotally connecting said portions and said members, and a resilient cushioning and sound absorbing washer interposed under compression between each of said respective portions and the opposed member.

4. In combination in a brake lever assembly of the character described, a supporting structure, a ratchet rod, a tubular guide member for said ratchet rod, said guide having at an intermediate portion thereof a pair of spaced parallel ears projecting laterally thereof to one side of the guide and rod axis and disposed in spaced opposition, a shell member embracing said tubular member and having matching ears abutting the outer sides of said tubular member ears, said shell member having detent pockets, with detent elements housed in said pockets and cooperating with said guide member for ratcheting engagement with said ratchet rod, said matching ears being pivotally secured to said supporting structure.

5. In combination in a brake lever assembly, a pull rod supporting structure including a pair of sheet metal shells having along one portion thereof edgewise abutting spacer flanges and at another portion thereof means securing the shells together while at a generally opposite portion from said means a pair of oppositely extending coplanar flanges, a connecting plate secured to and between said flanges, and a pull rod guide assembly pivotally secured within the chamber provided by said shells and with the pivot spaced from the guide axis adjacent to said laterally extending flanges and with the major portion of the guide assembly disposed movably between the pivot and said shell securing means.

6. In combination in a brake lever actuating mechanism, a housing comprising a pair of shells each including a side wall and an inturned angular rear edge flange, the side walls being in spaced parallel relation and the flanges being in edgewise abutment to maintain the spaced relation in order to provide a chamber within the housing, each of said shells having a top laterally extending flange for attachment of the housing to a support, the lower portions of the shells being inset into face-to-face abutment and secured together, said abutting rear edge flanges having an aperture therethrough, a brake actuating ratchet rod reciprocable and rotatable within said housing and through said aperture, a rod guiding and detent structure within said housing comprising a guide member carrying detent means and having attachment ear structure projecting therefrom toward the top of the housing assembly and away from said inset portions of the shells, and means pivotally connecting said ear structure pivotally between said side walls for swinging movement of the guiding and detent assembly with the rod on an arc below the pivot.

7. In combination in a brake lever assembly, a ratchet rod, a tubular guide for the ratchet rod disposed coaxially about the rod, a plurality of ball detents carried by said tubular guide and adapted for operative cooperation with the ratchet rod, springs biasing the detents into engagement with the ratchet rod, said tubular guide having a pair of ears projecting therefrom to one side of the guide and rod axis and disposed in spaced opposition, a supporting housing for said guide and detent assembly, and a pin disposed on an axis spaced from and transverse to the guide and rod axis pivotally securing said ears to said housing, said guide and detent assembly including a shell having a plurality of pockets supporting the biasing springs for said ball detents and including ears matching said first mentioned ears and having the pin extending therethrough for maintaining the shell and guide against axial displacement.

8. In combination in a brake lever actuating mechanism, a ratchet rod, a tubular guide member rotatably and reciprocably slidably supporting the ratchet rod, shell means carried by the tubular guide including detent structure operatively engaging with the ratchet rod, portions of the tubular member on the side thereof opposite the detent structure being struck out from the tubular member and projecting therefrom in planes substantially parallel to the axis of the rod and providing a pair of ears disposed in spaced opposition, said ears being of substantial extent away from said rod and having journal means disposed on an axis normal to the axis of the rod and spaced laterally substantially from the rod whereby the mechanism is adapted to be pivotally secured to a supporting structure, said shell means having ears thereon engaging said pair of ears and holding the shell means against rotation relative to the tubular guide member.

9. In combination in a brake lever assembly of the character described, a ratchet rod, a supporting housing adapted to be attached to an instrument panel or the like of a vehicle with which the assembly may be used, said housing providing a chamber having spaced apart walls, a guide and detent assembly for said rod mounted within said chamber and having spaced attachment ears projecting upwardly therefrom, said ears being disposed in spaced opposition to said walls, and spacer means disposed at the inner sides of said walls and engaging said ears to maintain the ears and thereby the guide and detent assembly in spaced relation to the walls.

BURNET J. POWELL.

REFERENCES CITED

The following references are of record in the file of this patent:

UNITED STATES PATENTS

| Number | Name | Date |
|---|---|---|
| 838,541 | Hicks, Jr. | Dec. 18, 1906 |
| 984,594 | O'Rourke | Feb. 21, 1911 |
| 1,713,842 | Link | May 21, 1929 |
| 1,803,937 | Jansson | May 5, 1931 |
| 2,274,133 | Fergueson | Feb. 24, 1942 |
| 2,295,782 | Jandus | Sept. 15, 1942 |
| 2,304,356 | Heller | Dec. 8, 1942 |
| 2,329,158 | Gill | Sept. 7, 1943 |
| 2,329,722 | Jandus | Sept. 21, 1943 |
| 2,377,691 | Jandus | June 5, 1945 |
| 2,522,540 | Sandberg | Sept. 19, 1950 |